United States Patent
Trisjono et al.

(10) Patent No.: US 9,213,613 B2
(45) Date of Patent: Dec. 15, 2015

(54) TEST PROGRAM GENERATOR USING KEY ENUMERATION AND STRING REPLACEMENT

(71) Applicant: Nvidia Corporation, Santa Clara, CA (US)

(72) Inventors: Frederick Trisjono, Santa Clara, CA (US); Sravanthi Ningampally, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 224 days.

(21) Appl. No.: 13/678,760

(22) Filed: Nov. 16, 2012

(65) Prior Publication Data

US 2014/0143599 A1 May 22, 2014

(51) Int. Cl.
*G06F 11/22* (2006.01)
*G06F 11/36* (2006.01)

(52) U.S. Cl.
CPC ........ *G06F 11/2252* (2013.01); *G06F 11/3684* (2013.01)

(58) Field of Classification Search
CPC .................................................. G06F 11/2252
USPC ..................................................... 714/32, 33
See application file for complete search history.

(56) References Cited

U.S. PATENT DOCUMENTS

| | | | |
|---|---|---|---|
| 5,754,755 A * | 5/1998 | Smith, Jr. | 714/38.1 |
| 6,002,869 A * | 12/1999 | Hinckley | 717/124 |
| 6,212,667 B1 * | 4/2001 | Geer et al. | 716/136 |
| 6,243,835 B1 * | 6/2001 | Enokido et al. | 714/38.1 |
| 6,473,659 B1 * | 10/2002 | Shah et al. | 700/79 |
| 6,718,521 B1 * | 4/2004 | Bentlage et al. | 716/136 |
| 6,829,731 B1 * | 12/2004 | LaFauci et al. | 714/33 |
| 6,934,934 B1 * | 8/2005 | Osborne et al. | 717/126 |
| 6,961,871 B2 * | 11/2005 | Danialy et al. | 714/30 |
| 6,966,052 B1 * | 11/2005 | Grindeland et al. | 717/131 |
| 6,970,816 B1 * | 11/2005 | Bryan et al. | 703/22 |
| 7,032,133 B1 * | 4/2006 | Lang et al. | 714/33 |
| 7,039,899 B1 * | 5/2006 | Quiroga | 717/115 |
| 7,058,857 B2 * | 6/2006 | Dallin | 714/38.14 |
| 7,240,268 B2 * | 7/2007 | Wrigley et al. | 714/739 |
| 7,366,951 B2 * | 4/2008 | Fallah et al. | 714/33 |
| 7,409,603 B2 * | 8/2008 | Shu et al. | 714/45 |
| 7,457,987 B2 * | 11/2008 | Franco et al. | 714/32 |
| 7,571,351 B2 * | 8/2009 | Miyazaki et al. | 714/25 |
| 7,631,227 B2 * | 12/2009 | Poisson et al. | 714/43 |
| 7,877,732 B2 * | 1/2011 | Day et al. | 717/124 |
| 8,006,136 B2 * | 8/2011 | Kube et al. | 714/33 |
| 8,132,052 B2 * | 3/2012 | Chen et al. | 714/32 |
| 8,132,053 B2 * | 3/2012 | Kube et al. | 714/32 |

(Continued)

*Primary Examiner* — Gabriel Chu
*Assistant Examiner* — Paul Contino (57) ABSTRACT

A system and method are provided for test program generation using key enumeration and string replacement. A system includes a test program generator and a tester. The tester receives a test program from the test program generator and tests one or more products according to the test program. The test program generator receives a seed file from a seed file database and a configuration file from a configuration file database. The test program generator iterates over enumeration keys in the configuration file and, for each key, apply to the seed file one or more rules in the configuration file keyed to the enumeration key. Applying a rule includes replacing in the seed file one or more occurrences of a predicate value of the rule with a transformation value of the rule. The test program generator also outputs to the tester the modified first seed file as the test program.

17 Claims, 9 Drawing Sheets

(56) References Cited

U.S. PATENT DOCUMENTS

| | | | |
|---|---|---|---|
| 8,132,155 B2* | 3/2012 | Gvillo | 717/124 |
| 8,140,899 B2* | 3/2012 | Ren et al. | 714/26 |
| 8,224,614 B2* | 7/2012 | Adir et al. | 702/119 |
| 8,429,614 B2* | 4/2013 | Zhang et al. | 717/124 |
| 8,433,953 B1* | 4/2013 | Gaudette et al. | 714/33 |
| 8,667,333 B2* | 3/2014 | Hill | 714/33 |
| 2007/0150249 A1* | 6/2007 | Asamoto | 703/14 |
| 2007/0169015 A1* | 7/2007 | Seelig et al. | 717/136 |
| 2007/0220392 A1* | 9/2007 | Bhaumik et al. | 714/742 |
| 2008/0126390 A1* | 5/2008 | Day et al. | 707/102 |
| 2008/0184206 A1* | 7/2008 | Vikutan | 717/127 |
| 2008/0222149 A1* | 9/2008 | Li et al. | 707/7 |
| 2008/0244315 A1* | 10/2008 | Johnson | 714/32 |
| 2008/0270841 A1* | 10/2008 | Quilter | 714/38 |
| 2010/0180260 A1* | 7/2010 | Chikkadevaiah et al. | 717/125 |
| 2010/0257406 A1* | 10/2010 | Chakra et al. | 714/32 |
| 2011/0106482 A1* | 5/2011 | Adir et al. | 702/119 |
| 2012/0109874 A1* | 5/2012 | Balog | 706/60 |
| 2012/0265490 A1* | 10/2012 | Kube et al. | 702/186 |
| 2013/0007522 A1* | 1/2013 | Kurapati et al. | 714/32 |
| 2013/0198567 A1* | 8/2013 | Ahmed et al. | 714/32 |
| 2013/0198568 A1* | 8/2013 | Ahmed et al. | 714/32 |
| 2014/0059382 A1* | 2/2014 | Atkinson et al. | 714/27 |
| 2014/0059522 A1* | 2/2014 | Chandra | G06F 11/3684 717/126 |
| 2014/0075242 A1* | 3/2014 | Dolinina et al. | 714/27 |
| 2014/0082420 A1* | 3/2014 | Greer | 714/33 |

* cited by examiner

502 — information description = "FT flow";

522 — device_name = "Tl14";

524 — device_revision = "A01";
    end

504 — •declarations

* * *

536 {
@ATE_BLOW_mcpTMSO = 0;
@ATE_TEMP = 90;
@ATE_VER = 0;

* * *

520 {
@DAC_SDTV_CALIB = 0;
@DEVICENAME = "T114";
@DL_FREQ = "NA";

* * *

534 — @PACKAGE_TYPE = "M";

* * *

@TEST_PROGRAM_REVISION = 0;
@TEST_STAGE = "FT";
@TEST_TEMP = "NA";

* * *
    end

506 — •test_suites
Assign_CPU1_CP:
    override = 1;
  override_testf = tm_605;
local_flags = output_on_pass, output_on_fail,
value_on_pass, value_on_fail, per_pin_on_pass,
per_pin_on_fail;
  site_match = 0;
    * * *
  end

FIG. 5A

```
508 ── . test_flow
        {
                @PROGRAM_SEL = "D_T114-ENG-A1_D";
                ***
        ⎧   @eqc_flow = 0;
   526 ⎨   @si_rev = "A01";
        ⎩   @SFTargetSkuVar = "NONE";

***
                @enable_dvs = 0;
                @ATE_TEMP 90;
                @IDDQ_CPU = 0;

***
        ⎧   @TF_HDCP_KEYTYPE = 18;
   530 ⎨   @pkg_dsc = 1;
        ⎩   @enable_checksum = 0;

***
                @FUSE_TJ_ADT = 0;
                @blow_sensor = 0;
                @fsdebug = 0;

***
        {
                        @dvfs_lp_char = 0;
                        @vmin_test = 1;
                        @vmax_test = 1;

***
                        @shmoo_log = 0;
                        @shmoo_log_vmin = 0;
                        @shmoo_log_vmax = 0;
                        @fmax_log = 0;

***
                        @DAC_SDTV_CALIB = 0;
                        @DEVICENAME = "TI14";
```

FIG. 5B

```
@ECID_MAC_L = 0;
@ECID_MAC_U = 0;

* * *
}, closed, "init_misc" , "init_misc"

* * *
if @TEST_STAGE == "FT" or
@TEST_STAGE == "SUPER1" or
@TEST_STAGE == "QA" then
{
        run (set_adt_relay4) ;
        if @IDDQ_FUSED_SOC != 0 or
@IDDQ_FUSED_CPU != 0 then
        {
        run_and_branch(Tj_ADT_pretest_1)
        then
        {
        }
        else
        {
        } run_and_branch (iddq_calibrated_core_cpu_rescreen)
        then
        {
        }
        else
        {
                stop_bin "421", "iddq_calibrated", ,
bad, noreprobe, red, 5, over_on;
        }
      }
      else
      {
        run_and_branch (Tj_ADT_pretest_1_2)
        then
        {
        }
        else
        {
        }
        run_and_branch (iddq_calibrated_core_cpu)
        then
        {
        }
```

FIG. 5C

```
            else
            {
                    stop_bin "421", "iddq_calibrated", ,
    bad, noreprobe, red, 5, over_on;
            }
        }
    * * *
    end
```

510 ⟶ .context
532 { context_config_file = "t114.D.a01.pins.00.3";
context_levels_file = "t114.D.a01.level.00.3";
context_timing_file = "t114.D.a01.timing.00.3";
context_vector_file = "t114.D.a01.master.00.3";
context_channel_attrib_file =
"t114_dsc_fxdl_site_all";
end

FIG. 5D

602 — ## ENUMERATION-KEY list:

{device} = <T114>, <T35>
{package} = <M>, <D>
{dierev} = <A01>, <A02>
{teststage} = <WS1>, <WS2>, <FT1>, <FT2>, <SUPER1>
{sku} = <AP40-ES-A1>, <PFG>,<NOBLOW>
{temp} = <90C>, <25C>, <D>, <A>
603 — {deletelist} = <*FT2*SHMOO*>, <*.FT1.*T114-*25C*>,
603c — <*.FT2.*90C*>   603a   603b

600

604 — ## STRING-REPLACEMENT list

606 { [{device}= <T35>] | <@DEVICENAME = "T114";> | <@DEVICENAME = "T35";>

608 { [{device}= <T35>] | <device_name = "T114";> | <device_name = "T35";>

610 { [{dierev}= <A01P>] | <device_revision = "A01";> | <device_revision = "A01P";>

612 { [{dierev}= <A01P>] | <@si_rev = "A01"; > | <@si_rev = "A01P";>

614 { [{package}=<M>] | <@pkg_dsc = 1;> | <@pkg_dsc = 0;>
     [{package}=<M>] | <t114.D.aOl.pins.00.3> |
616 — <t114.M.a01.pins.00.3>

[{teststage}=<WS1>] | <@pkg_dsc = 1;> | <@pkg_dsc = 0;>
[{teststage}=<WS1>] | <@TEST_STAGE = "FT";> | <@TEST_STAGE = "CP1";>

[{teststage}=<WS2>] | <@pkg_dsc = 1;> | <@pkg_dsc = 0;>
[{teststage}=<WS2>] | <@TEST_STAGE = "FT";> | <@TEST_STAGE = "CP2";>

[{teststage}=<FT1>] | <@PROGRAM_SEL = "D_T114-ENG-A1_D";> | <@PROGRAM_SEL = "D_T114-ENG-A1_D";>

[{teststage}=<FT2>] | <@PROGRAM_SEL = "D_T114-ENG-A1_D";> | <@PROGRAM_SEL = "D_T114-ENG-A1_D";>
[{teststage}=<FT2>] | <@vmin_test = 1;> | <@vmin_test = 0;>

[{sku}=<SHMOO>] | <@shmoo_log_vmin = 0;>1 <@shmoo_log_vmin = 1;>

[ {temp} =<25C>] | <@ATE_TEMP = 90;>| <@ATE_TEMP = 25;>
618 —   618a    618b    618c

FIG. 6

702 ── ## ENUMERATION-KEY list:

{package} = <A>, <P>, <E>
{temp} = <90C>, <105C>

703 ⎧ {deletelist} = <AP20.M.*.105C.*>,
    ⎩ <AP20.P.*.105C.*>, <AP20.A.*.90C.*>, <*.E.*90C*>

704 ── ## STRING-REPLACEMENT list

706 ⎧ [{temp}=<105C>] | <testmethod_parameters =
    ⎪ "ADTSDATA:Tj_ADT:90:12:1:";> |
    ⎪ <testmethod_parameters =
    ⎪ "ADTSDATA:Tj_ADT:105:12:1:";>
    ⎨ [{temp}=<105C>] | <testmethod_parameters =
    ⎪ "ADTSDATA: IDDQ_MEAS_LP, IDDQ_MEAS_G:OPT_IDDQ_LP,OPT_
    ⎪ IDDQ_G:90 :YES:NO:50:0:500:1:";> |
    ⎪ <testmethod_parameters =
    ⎪ "ADTSDATA: IDDQ_MEAS_LP, IDDQ_MEAS_G:OPT_IDDQ_LP,OPT_
    ⎩ IDDQ_G:105:YES:NO:50:0:500:1:";>

##########################################

708 ⎧ [{package}=<A>] | <ap20.a03.level.00.2> |
    ⎩ <ap20.a03auto.level.00.4>

[{package}=<A>] | <b_ap2 0_a03_mbist_pll_m_1> |
<b_ap20_a03_mbist_pll_a_1>

[{package}=<A>] | <mox_atpg_A03_split0_wIN> |
<mox_atpgAuto_A03_wIN>

##########################################

710 ⎧ [{package}=<P>] | <ap20.a03.pins.00.5_PTH> |
    ⎩ <ap20p.a03.pins.00.4_PTH>

[{package}=<P>] | <testmethod_parameters =
"continuity_pins; PLL_S_PLL_LF; pex_conti; ***
5:PPMU_Parallel:Single:YES:";> |
<testmethod_parameters = "continuity_pins;
PLL_S_PLL_LF:-0.1; * * *
4:PPMU_Parallel:Single:NO:";>

[{package}=<P>] | <@BIN1_IDDQ_UPPER = 1200;> |
<@BIN1_IDDQ_UPPER = 900;>
[{package }=<P>] | <@IDDQ_MEAS_G < 550> |
<@IDDQ_MEAS_G < 327>

FIG. 7A

[{package}=<P>] | <@IDDQ_MEAS_G < 775> |
<@IDDQ_MEAS_G < 660>
[{package}=<P>] | <@IDDQ_MEAS_G < 1200> |
<@IDDQ_MEAS_G < 900>

[ {package} =<P>] |
<mox_ftm_2clk_A03_splitO_wIN_rev2> |
<mox_ftm_A03_vmin_splitO_rev1_wIN>

[{package}=<P>] | <mox_ftm_2clk_A03_wIN_rev2> |
<mox_ftm_A03_vmax_rev1_wIN>

#####################################################

712 { [{package }=<E>] | <ap20. a03 .level. 00.2> |
<ap20.a03auto.level.00.4>

[{package}=<E>] | <b_ap20_a03_mbist_pll_m_1> |
<b_ap20_a03_mbist_pll_a_1>

[{package}=<E>] | <b_ap20_a03_rombist_pll_m_3> |
<b_ap20_a03_rombist_pll_a_3>

[ {package} =<E>] |
<mox_ftm_2clk_A03_splitO_wIN_rev2> |
<mox_ftm_2clk_A03_auto_wIN_rev3>
[{package}=<E>] | <mox_ftm_2clk_A03_wIN_rev2> |
<mox_ftm_2clk_A03_auto_wIN_rev3>

[{package}=<E>] | <@IDDQ_MEAS_G < 1200> |
<@IDDQ_MEAS_G < 2849>
[{package}=<E>] | <@SPEED_MEAS_G > 276> |
<@SPEED_MEAS_G > 279>
[{package}=<E>] | <@SPEED_MEAS_G <= 443> |
<@SPEED_MEAS_G < 445>
[{package}=<E>] | <@BIN1_IDDQ_UPPER = 1200;> |
<@BIN1_IDDQ_UPPER = 2849;>

FIG. 7B

TEST PROGRAM GENERATOR USING KEY ENUMERATION AND STRING REPLACEMENT

TECHNICAL FIELD

This application is directed, in general, to test program generation and, more specifically, to a test program generator using key enumeration and string replacement.

BACKGROUND

For an integrated circuit ("chip") product, a manufacturer may have a plurality of circuit layout revisions, a further plurality of packaging options, and further pluralities of specifications for other characteristics, including operating temperature and/or clock speed. Thus, there are a large number of stock keeping units ("SKUs") representing differing combinations of these variations in revision, package, temperature, clock, and other characteristics or capabilities.

To test for proper functionality of a product, each SKU may require an individualized suite of test programs (or "test flows") for its particular combination of characteristics and/or capabilities. Additionally, production flows may be required that specify post fabrication production steps for producing the desired SKU. Such production flows may include, for example, blowing fuses in a chip to enable/disable particular functionality of the chip.

Command files codifying such production and test flows are typically generated by hand. An engineer typically identifies, selects and combines the suite of test flows individually for each SKU. Changes or additions to such command files often must be replicated across multiple files. Such changes and/or additions may require extensive engineering time and may be prone to error.

SUMMARY

One aspect provides a method for generating a test program. The method includes receiving a seed file and a configuration file and iterating over one or more enumeration keys in the configuration file. The method also includes, for each enumeration key, applying to the seed file one or more rules in the configuration file that are keyed to the enumeration key, where applying such a rule comprises replacing in the first seed file one or more occurrences of a predicate value of the rule with a transformation value of the rule. The method further includes outputting the modified seed file as a test program.

Another aspect provides a system that includes a test program generator and a tester. The tester is configured to receive a test program from the test program generator and test one or more products according to the test program. The test program generator is configured to receive from a seed file database a seed file and from a configuration file database a configuration file. The test program generator is also configured to iterate over one or more enumeration keys in the configuration file and, for each enumeration key, apply to the seed file one or more rules in the configuration file that are keyed to the enumeration key, where applying such a rule comprises replacing in the seed file one or more occurrences of a predicate value of the rule with a transformation value of the rule. The test program generator is further configured to output to the tester the modified first seed file as the test program.

Yet another aspect provides a non-transitory, computer readable medium that stores instructions. When executed by a processing system, the instructions cause the processing system to generate a test program. Steps performed by the processing system include receiving from a seed file database a seed file and from a configuration file database a configuration file and iterating over one or more enumeration keys in the configuration file. The steps also include, for each enumeration key, applying to the seed file one or more rules in the configuration file keyed to the enumeration key, where applying such a rule comprises replacing in the seed file one or more occurrences of a predicate value of the rule with a transformation value of the rule. The steps further include outputting the modified seed file as a test program.

BRIEF DESCRIPTION

Reference is now made to the following descriptions taken in conjunction with the accompanying drawings, in which:

FIG. 6 is a testflow configuration file according to the disclosure; and

DETAILED DESCRIPTION

Figure 1:
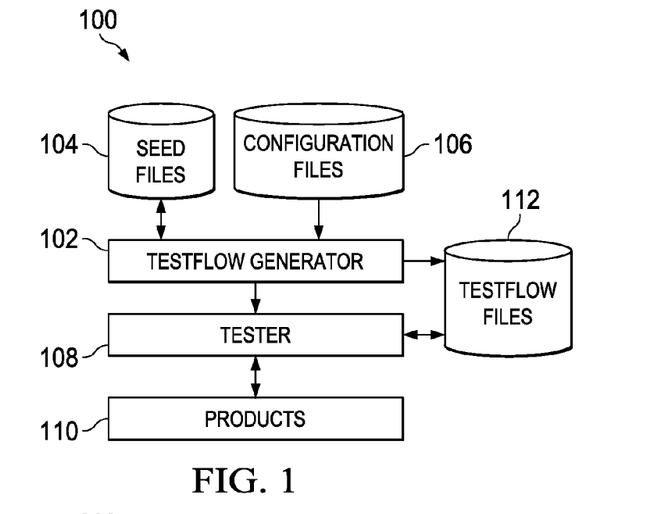
FIG. 1 is a block diagram of a testing system according to the disclosure.

FIG. 1 is a block diagram of a testing system 100 according to the disclosure. A testflow generator 102 (or "test program generator") is coupled to a seed file database 104 and to a configuration file database 106. In a first circumstance, the testflow generator 102 receives a testflow seed file (or, more simply, seed file) from the seed file database 104 and a configuration file from the configuration file database 106 and generates a seed file for storage in the seed file database 104.

In a second circumstance, the testflow generator 102 receives a seed file from the seed file database 104 and a configuration file from the configuration file database 106 and generates a testflow file (or "test program"). The testflow file is sent to a tester 108 to cause testing of one or more integrated circuit products 110. Either the testflow generator 102 or the tester 108 may store testflow files in a testflow database 112 for later use by the tester 108.

A chip may be used in a plurality of product families—referred to for purposes of this disclosure as M, A, P, and E families. Each product family may include one or more of a plurality of chip layout revisions, a further plurality of packaging options, and further pluralities of specifications for characteristics such as operating temperature and/or clock speed. That is, there will be a plurality of SKUs representing differing combinations of revision, package, temperature, clock, and other characteristics or capabilities.

In the first circumstance mentioned above, and described in more detail below with reference to FIGS. 3, 5 (which subsumes, and functions as a guide for arranging, FIGS. 5A-5D) and 7 (which subsumes, and functions as a guide for arranging, FIGS. 7A-7B), the testflow generator 102 receives a testflow seed file associated with an M family product (an "M seed file") and a seed configuration file associated with a A, P, and E family products (an "A/P/E seed configuration file") and generates testflow seed files associated with A, P, and E family products (respectively, an "A seed file," a "P seed file," and an "E seed file").

In the second circumstance mentioned above, and described in more detail below with reference to FIGS. 2, 5 and 6, the testflow generator 102 receives an M seed file and a testflow configuration file associated with an M family product (an "M testflow configuration file") and generates a testflow file associated with an M family product (an "M testflow file").

The test program generator 102 is a processing system that includes one or more subsystems adapted to receive and execute programs stored on one or more types of computer readable medium. The phrase "computer readable medium" includes any type of non-transitory medium capable of being accessed by a computer, such as read only memory (ROM), random access memory (RAM), a hard disk drive, a compact disc (CD), a digital video disc or digital versatile disc (DVD), or any other type of medium. Instructions implementing part or all of one or more methods according to the disclosure may be stored on such a computer readable medium for execution by the test program generator 102.

Figure 2:
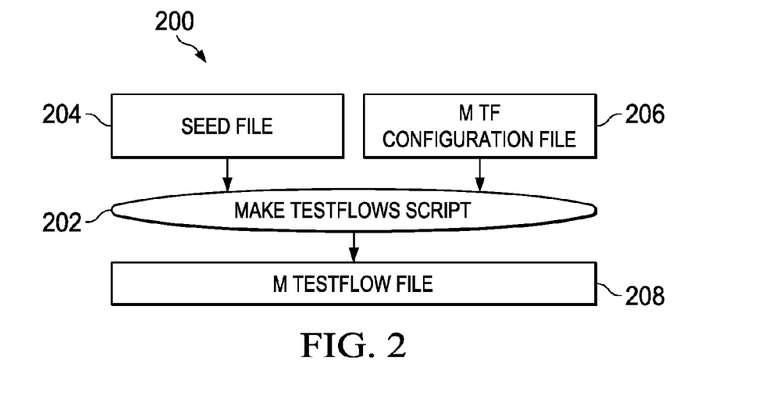
FIG. 2 is a is block diagram of a system for generating a testflow file according to the disclosure.

FIG. 2 is a is block diagram of a system 200 for generating a testflow file according to the disclosure. The testflow generator 102 executes a Make-testflows script 202 ("Mktfs script"), which receives a seed file 204 and an M testflow configuration file 206, and generates an M testflow file 208. As explained in greater detail with reference to FIGS. 5 and 6, the Mktfs script 202 iterates through keys that are enumerated in the configuration file 206, applying rules from the configuration file 206 to modify the seed file 204 and generate the testflow file 208.

Operation of the Mktfs script 202 may be explained with reference to FIGS. 5 and 6. FIG. 5 is a testflow seed file 500 according to the disclosure. The seed file 500 includes an information section 502, a declarations section 504, a test suites section 506, a testflow section 508, and a context section 510. It will be understood that a seed file according to the disclosure may additionally or alternatively include sections with other types of information. Also, the sections 502-510 of the seed file 500 may additionally or alternately include other information than that shown in FIG. 5.

The testflow section 508 describes a testflow. The testflow is identified in the information section 502 as an FT testflow for a T114 device of revision A01. As may be seen at statements 534 and 536, respectively, the testflow seed file 500 defines a testflow for an M family product rated for 90 degree Centigrade operation. However, testflow seed file 500 additionally establishes the testflow variables and looping/branching structures used in testing all of the M, A, P and E product families.

FIG. 6 is a testflow configuration file 600 according to the disclosure. The configuration file 600 includes an enumeration key list 602, a delete list 603, and a string replacement list 604. Elements of the delete list 603 and the string replacement list 604 are also referred to herein as rules.

Each rule in the string replacement list 604 includes an enumeration key value 618a, a predicate value 618b, and a transformation value 618c. Enumeration keys listed in the enumeration key list 602 act as switches that turn on corresponding rules in the string replacement list 604. The Mktfs script 202 iterates through keys in the enumeration keys section 602 and applies any rules in the string replacement list 604 having a matching enumeration key value 618a to the testflow seed file 500. Wherever the predicate search string value 618b is found in the testflow seed file 500, it is replaced with the transformation value 618c.

The enumeration keys 602 are grouped in six categories: {device}, {package}, {dierev}, {teststage}, {sku}, and {temp}. In each category, one or more enumeration key values are listed. It will be understood that in other embodiments, more or fewer categories may be used, and more or fewer keys within each category may be listed. It will also be understood that any sequence of iteration over the enumeration keys 602 falls within the scope of the disclosure.

Figure 5:
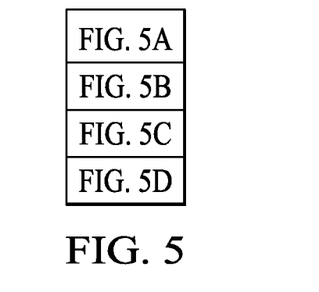
FIG. 5 (which subsumes, and functions as a guide for arranging, FIGS. 5A-5D) is a testflow seed file according to the disclosure.
Figure 5A:
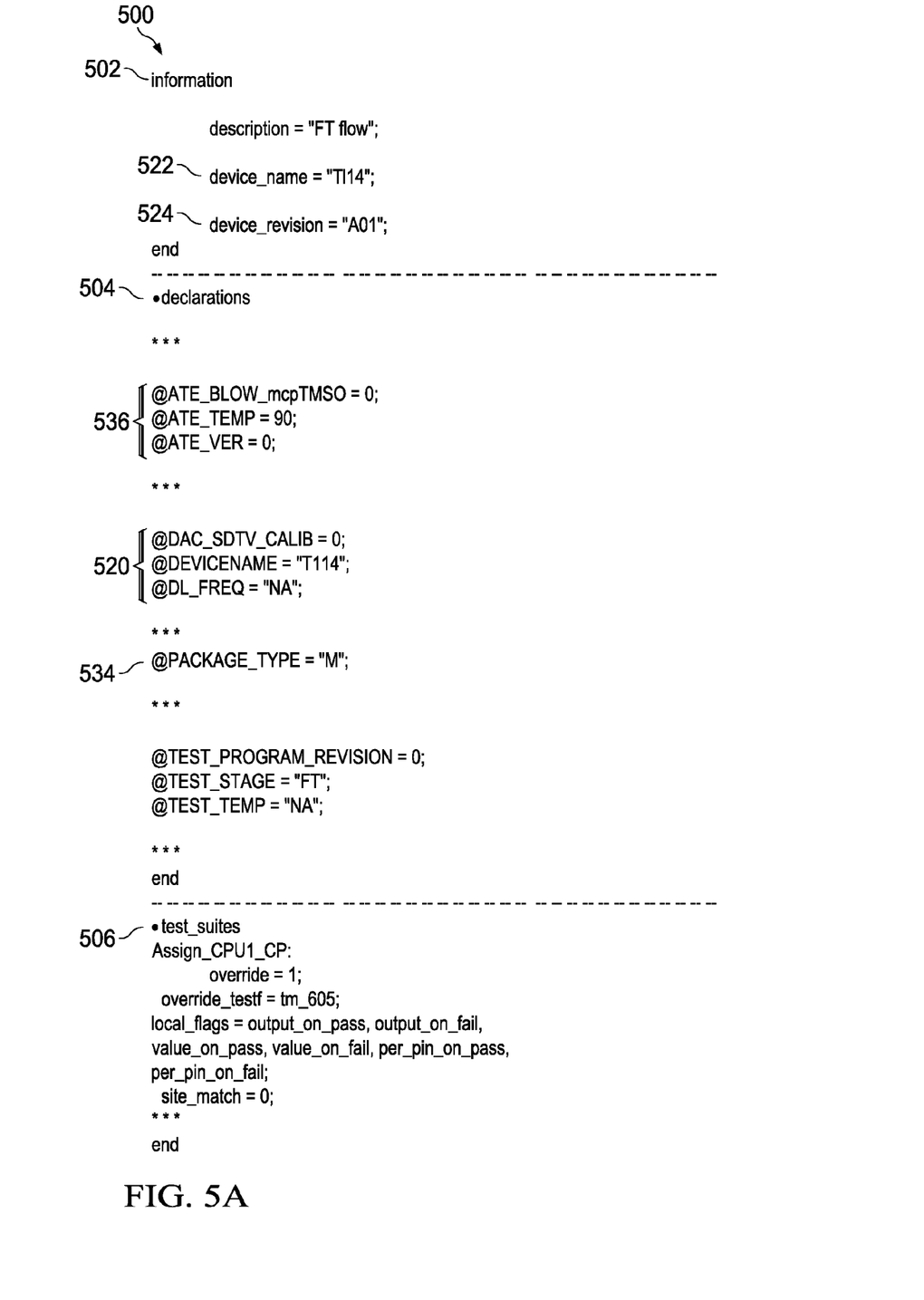
Figure 5B:
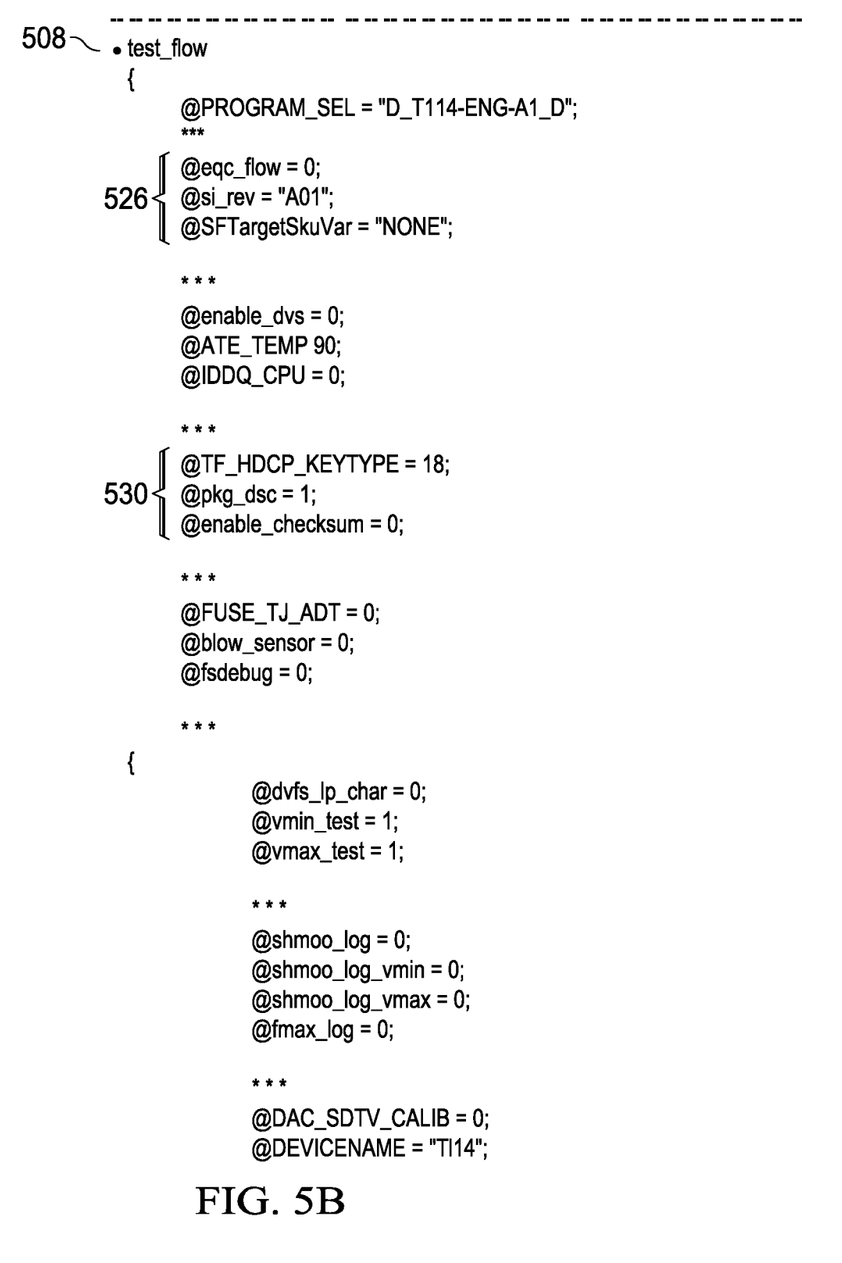
Figure 5C:
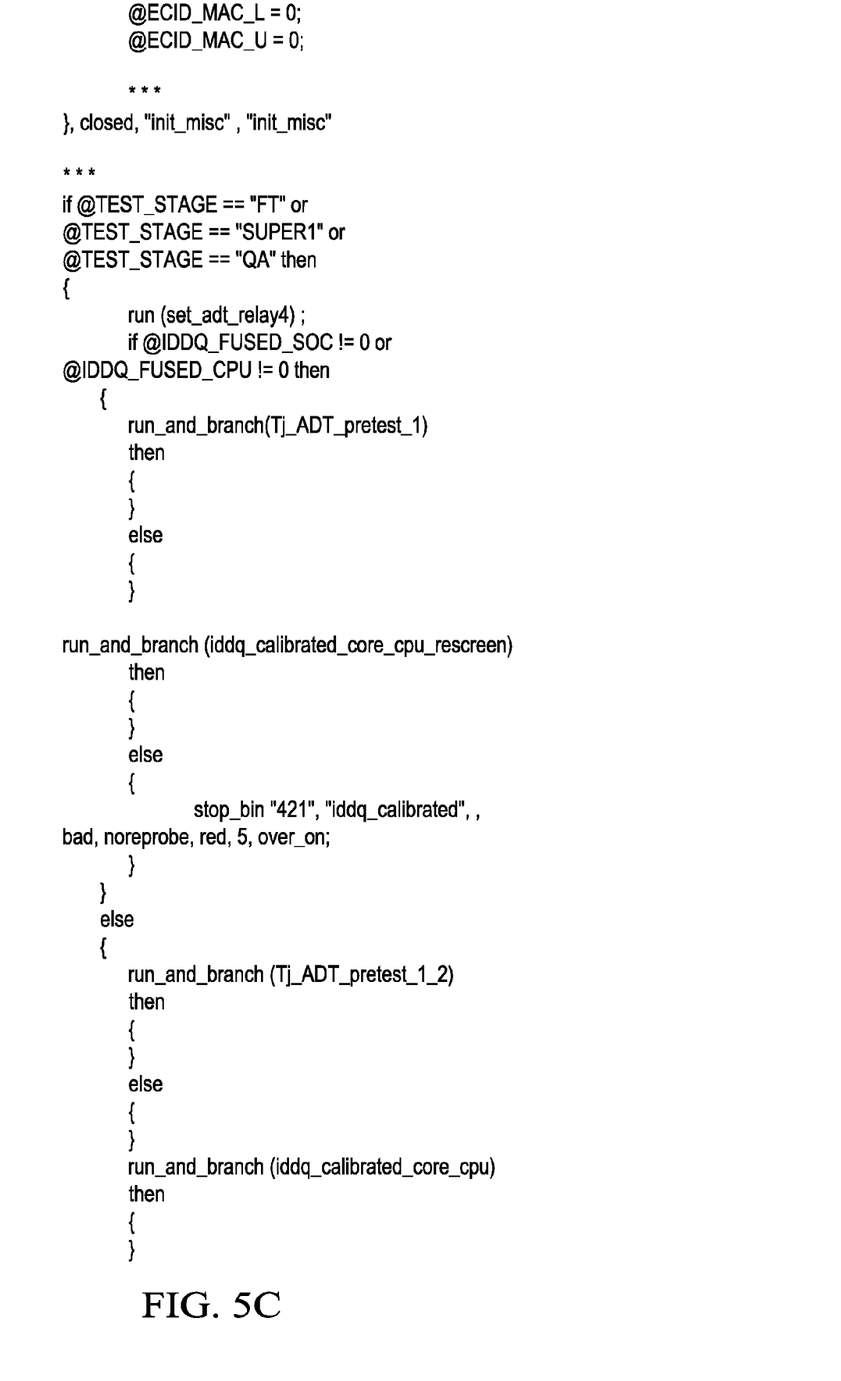
Figure 5D:
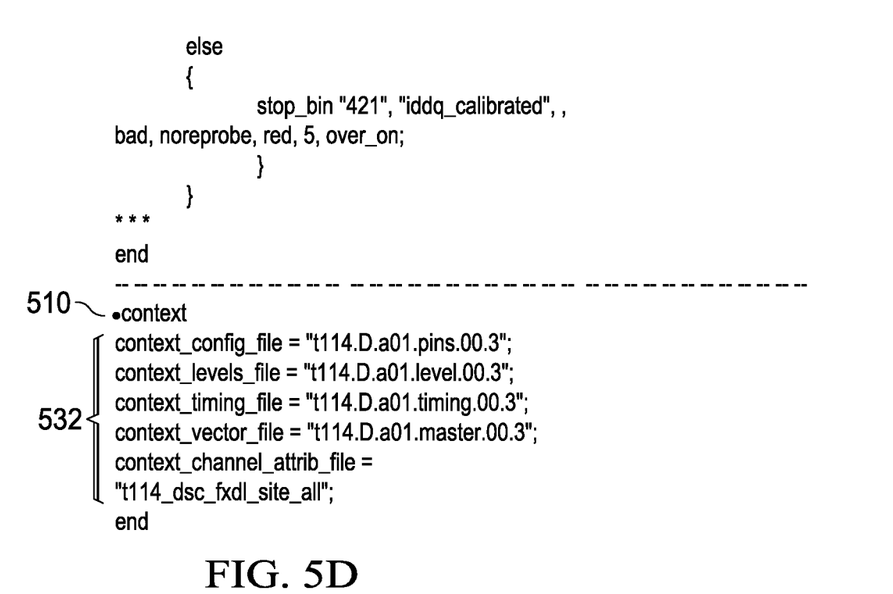

When the Mktfs script 202 iterates through the keys of the enumeration keys section 602 and applies the rules of the string replacement list 604 to the testflow seed file 500, the following transformations are performed (with references to both FIGS. 5 and 6).

Because {device} enumeration key <T35> appears in the enumeration keys section 602, rules 606 and 608 are applied. When the rule 606 is applied, statement 520 is transformed into "@DEVICENAME="T35";". When the rule 608 is applied, statement 522 is transformed into "device_name="T35";".

Because {dierev} enumeration key <A01P> does not appear in the enumeration keys section 602, rules 610 and 612 are not applied.

Because {package} enumeration key <M> appears in the enumeration keys section 602, rules 614 and 616 are applied and transform statements 530 and 532, respectively.

It will be understood that in some embodiments the predicate value of a rule may be found in multiple locations in the seed file, and the rule's transformation value applied in each such location.

Rules in the delete list 603 do not include enumeration keys. Rules in the delete list 603 include predicate values 603a, 603b, and 603c. Once all enumeration keys have been iterated, the Mktfs script 202 iterates through the rules of the delete list 603, searching in the testflow seed file 500 for the predicate search string value of each rule, and where found replacing it with an implied transformation value of the empty string—i.e., deleting the predicate string.

As may be seen, predicate values in the delete list 603 may include a 'wildcard' character ("*"), which matches any substring of one or more characters. As such, the predicate value <*FT2*SHMOO*> will match any string that includes the substring "FT2", followed one or more characters later by the substring "SHMOO".

Seed file modification according to the rules of string replacement list 604 may produce strings identifying, for example, testflows that do not exist. In this example, a testflow "FT2" is never used with an SKU "SHMOO", therefore the delete list 603 includes the predicate <*FT2*SHMOO*>, causing any testflow name that includes those two values to be deleted.

In other embodiments, rules without enumeration keys may perform actions other than deleting predicate values. Such rules may replace predicate key values with transformation key values, or perform other such transformations to the seed file.

Once the Mktfs script 202 has completed applying all rules of the testflow configuration file 600, the transformed testflow seed file 500 is output as M testflow file 208.

Figure 3:
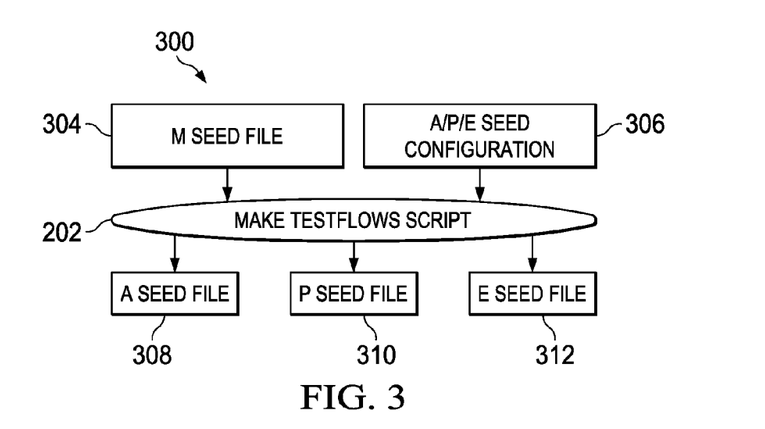
FIG. 3 is a block diagram of a system for generating testflow seed files according to the disclosure.

FIG. 3 is a block diagram of a system 300 for generating testflow seed files according to the disclosure. The Mktfs script 202 receives an M seed file 304 and an A/P/E seed configuration file 203, and generates an A seed file 308, a P seed file 310, and an E seed file 312. As explained in greater detail with reference to FIGS. 5 and 7 the Mktfs script 202 applies rules from the configuration file 306 to modify the seed file 304 and generate the seed files 308-312.

Figures 7, 7A:
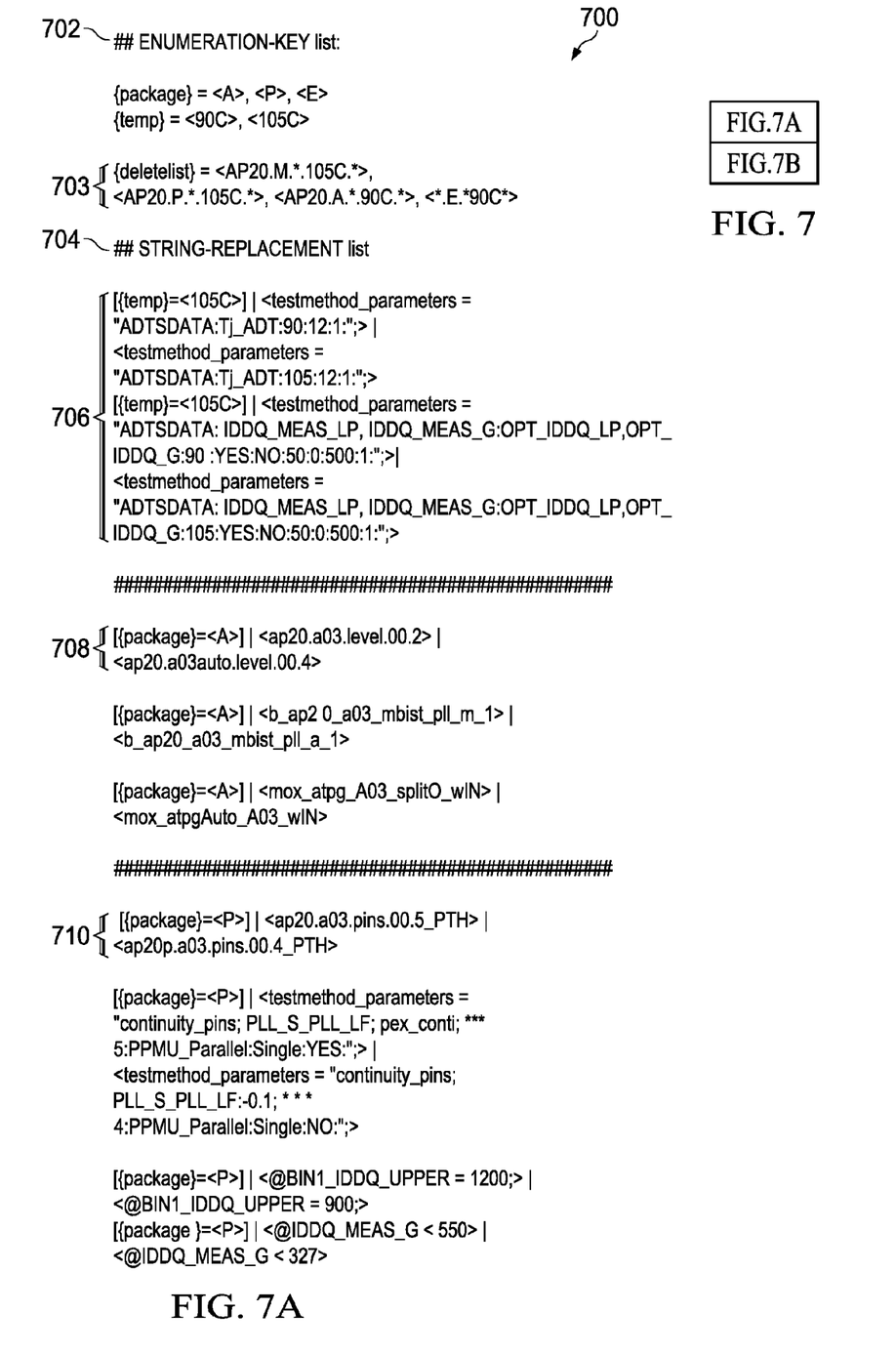
FIG. 7 (which subsumes, and functions as a guide for arranging, FIGS. 7A-7B) is a seed configuration file according to the disclosure.
Figure 7B:
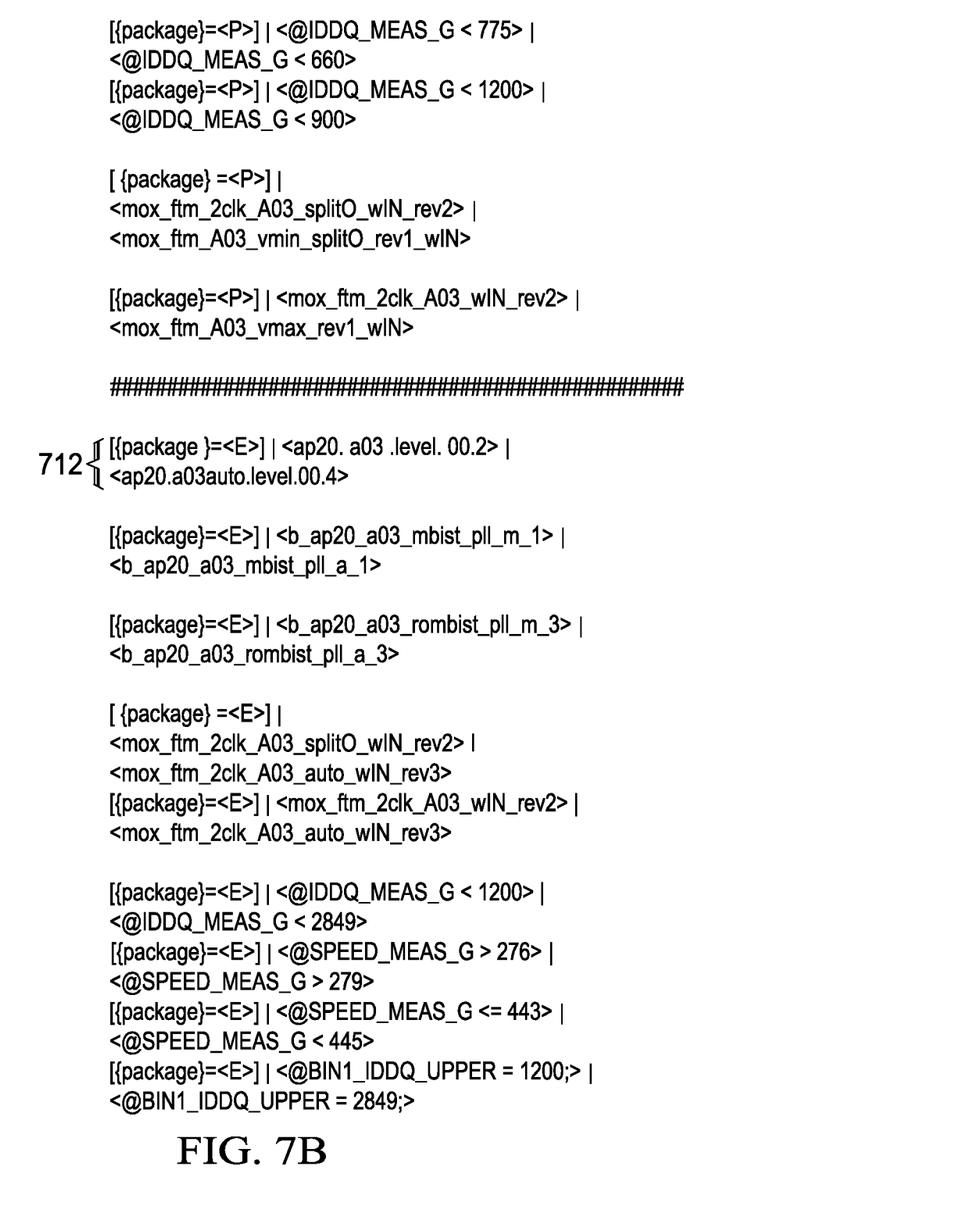

FIG. 7 is a seed configuration file 700 according to the disclosure. The configuration file 700 includes an enumeration key list 702, a delete list 703, and a string replacement list 704. The rules of the string replacement list 704 include temperature transformation rules 706, "A" family seed transformation rules 708, "P" family transformation rules, and "E" family transformation rules.

The enumeration key list 702 includes enumeration keys for A, P and E families, so applying the seed configuration file 700 to the seed file 500 produces an A seed file, a P seed file, and an E seed file. The enumeration key list 702 includes enumeration keys for 90 C and 105 C devices, so applying the seed configuration file 700 to the seed file 500 produces seed files suitable for generating testflow files for both 90 C and 105 C devices.

The Mktfs script 202 iterates over the keys in the enumeration key list 702 to apply the rules of the string replacement list 704 and the delete list 703 to the seed configuration file 700 in the same manner as described with reference to the testflow configuration file 600 of FIG. 6.

Because the seed file 500 is a seed file defining a testflow for an M family product rated for 90 degree Centigrade operation, it may be referred to as an "M(90 C)" seed file. The seed configuration file 700 includes enumeration keys in the enumeration key list 702 for A, P and E families and enumeration keys for 90 C and 105 C devices. When the Mktfs script 202 applies the seed configuration file 700 to the seed file 500 the result is seed files for M(90 C), M(105 C), A(90 C), A(105 C), P(90 C), P(105 C), E(90 C), and E(105 C) products. The Mktfs script 202 then applies the delete list 703 to eliminate the seed files for M(105 C), A(90 C), P(105 C), and E(90 C).

Figure 4:
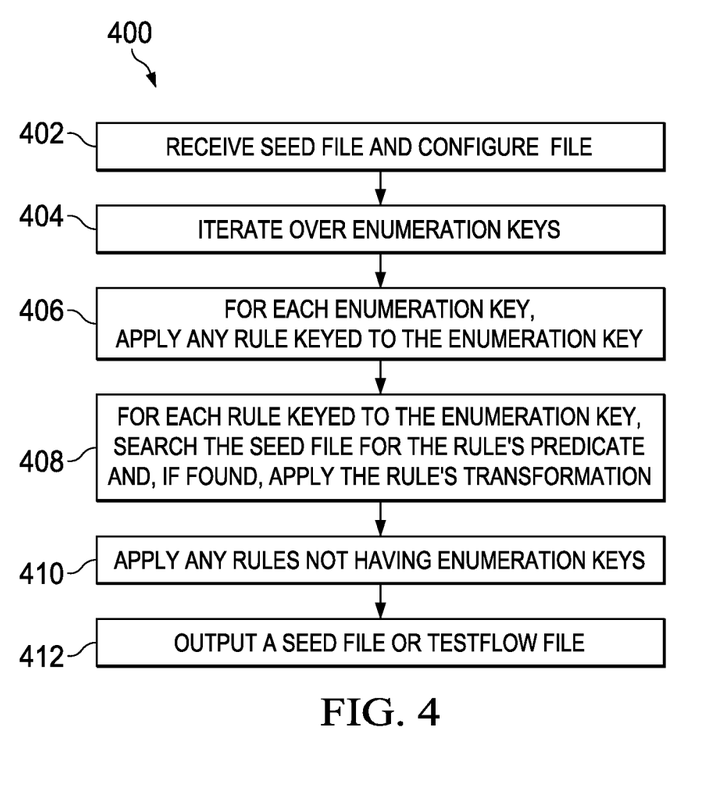
FIG. 4 is a method for generating a testflow seed file or testflow file according to the disclosure.

FIG. 4 is a method 400 for generating a testflow seed file or testflow file according to the disclosure. In step 402, the method receives a seed file and a configuration file.

In step 404, the method iterates over one or more enumeration keys in the configuration file. The enumeration keys may be listed in one or more categories, with one or more enumeration keys in each category.

In step 406, for each enumeration key, the method applies one or more rules in the configuration file that are keyed to the enumeration key. For each such rule, in step 408, the method searches the seed file for a pattern matching the rule's predicate value and, where found, applies the rule's transformation value.

In step 410, the method applies any rules in the configuration file that do not have enumeration keys. In step 412, the method outputs the seed file or testflow file created by applying the rules of the configuration file to the received seed file.

Those skilled in the art to which this application relates will appreciate that other and further additions, deletions, substitutions and modifications may be made to the described embodiments.

What is claimed is:

1. A method for generating a test program, the method comprising:
   receiving a first seed file and a first configuration file;
   iterating over one or more first enumeration keys in the first configuration file;
   for each of the one or more first enumeration keys, applying to the first seed file a first rule in the first configuration file keyed to the one or more first enumeration keys, where applying the first rule comprises replacing in the first seed file one or more occurrences of a predicate value of the first rule with a transformation value of the first rule, wherein the first rule is defined in the first configuration file as containing one of the one or more first enumeration keys, the predicate value of the first rule and the transformation value of the first rule;
   applying to the first seed file a rule in the first configuration file not keyed to the one or more first enumeration keys, where applying the non-keyed rule comprises replacing in the first seed file one or more occurrences of a predicate value of the non-keyed rule with a transformation value of the non-keyed rule, and
   outputting the modified first seed file as a test program.

2. The method as recited in claim 1, further comprising:
   receiving a second seed file and a second configuration file;
   iterating over one or more second enumeration keys in the second configuration file;
   for each of the one or more second enumeration keys, applying to the second seed file a second rule in the second configuration file keyed to the one or more second enumeration keys, where applying the second rule comprises replacing in the second seed file one or more occurrences of a predicate value of the second rule with a transformation value of the second rule; and
   outputting the modified second seed file as the first seed file.

3. The method as recited in claim 1, wherein the predicate value of the non-keyed rule is a first string and the transformation value of the non-keyed rule is an empty string.

4. The method as recited in claim 1, wherein the predicate value of the first rule is a first string and the transformation value of the first rule is a second string.

5. The method as recited in claim 1, wherein values of the one or more first enumeration keys are grouped into one or more categories and the first rule in the first configuration file is keyed to the one or more first an enumeration keys using the one or more first enumeration keys and the one or more categories.

6. A system comprising:
   a computer;
   a test program generator; and
   a tester configured to receive a test program from the test program generator and test one or more products according to the test program,
   wherein the test program generator is configured to:
      receive from a seed file database a first seed file and from a configuration file database a first configuration file;
      iterate over one or more first enumeration keys in the first configuration file;
      for each of the one or more first enumeration keys, apply to the first seed file a first rule in the first configuration file keyed to the one or more first enumeration keys, where applying the first rule comprises replacing in the first seed file one or more occurrences of a predicate value of the first rule with a transformation value of the first rule, wherein the first rule is defined in the first configuration file as containing one of the one or more first enumeration keys, the predicate value of the first rule and the transformation value of the first rule;
      apply to the first seed file a rule in the first configuration file not keyed to the one or more of first enumeration keys, where applying the non-keyed rule comprises replacing in the first seed file one or more occurrences of a predicate value of the non-keyed rule with a transformation value the non-keyed rule; and
      output to the tester the modified first seed file as the test program.

7. The system as recited in claim 6, wherein the test program generator is further configured to:

receive from the seed file database a second seed file and from the configuration file database a second configuration file;

iterate over one or more second enumeration keys in the second configuration file;

for each of the one or more second enumeration keys, apply to the second seed file a second rule in the second configuration file keyed to the one or more second enumeration keys, where applying the second rule comprises replacing in the second seed file one or more occurrences of a predicate value of the second rule with a transformation value of the second rule; and output the modified second seed file to the seed file database as the first seed file.

8. The system as recited in claim 6, wherein at least one of the test program generator and the tester is further configured to store the test program in a test program database for use by the tester.

9. The system as recited in claim 6, wherein the predicate value of the non-keyed rule is a first string and the transformation value of the non-keyed rule is an empty string.

10. The system as recited in claim 6, wherein the predicate value of the first rule is a first string and the transformation value of the first rule is a second string.

11. The system as recited in claim 6, wherein values of the one or more first enumeration keys are grouped into one or more categories and the first rule in the first configuration file is keyed to the one or more of first enumeration keys using the one or more first enumeration keys and the one or more categories.

12. A non-transitory, computer readable medium storing instructions that, when executed by a processing system, cause the processing system to generate a test program, by performing the steps of:

receiving from a seed file database a first seed file and from a configuration file database a first configuration file;

iterating over one or more first enumeration keys in the first configuration file;

for each of the one or more first enumeration keys, applying to the first seed file a first rule in the first configuration file keyed to the one or more first enumeration keys, where applying the first rule comprises replacing in the first seed file one or more occurrences of a predicate value of the first rule with a transformation value of the first rule, wherein the first rule is defined in the first configuration file as containing one of the one or more first enumeration keys, the predicate value of the first rule and the transformation value of the first rule;

applying to the first seed file a rule in the first configuration file not keyed to the one or more first enumeration keys, wherein applying the non-keyed rule comprises replacing in the first seed file one or more occurrences of a predicate value of the non-keyed rule with a transformation value of the non-keyed rule; and outputting the modified first seed file as a test program.

13. The computer readable medium as recited in claim 12, wherein the steps further comprise:

receiving from the seed file database a second seed file and from the configuration file database a second configuration file;

iterating over one or more second enumeration keys in the second configuration file;

for each of the one or more second enumeration keys, applying to the second seed file a second rule in the second configuration file keyed to the one or more second enumeration keys, where applying the second rule comprises replacing in the second seed file one or more occurrences of a predicate value of the second rule with a transformation value of the second rule; and outputting the modified second seed file to the seed file database as the first seed file.

14. The computer readable medium as recited in claim 13, wherein the step of outputting the modified first seed file as a test program comprises storing the test program in a test program database.

15. The computer readable medium as recited in claim 12, wherein the predicate value of the non-keyed rule is a first string and the transformation value of the non-keyed rule is an empty string.

16. The computer readable medium as recited in claim 12, wherein the predicate value of the first rule is a first string and the transformation value of the first rule is a second string.

17. The computer readable medium as recited in claim 12, wherein values of the one or more first enumeration keys are grouped into one or more categories and the first rule in the first configuration file is keyed to the one or more first enumeration keys using the one or more first enumeration keys and the one or more categories.

* * * * *

UNITED STATES PATENT AND TRADEMARK OFFICE
CERTIFICATE OF CORRECTION

PATENT NO.        : 9,213,613 B2
APPLICATION NO.   : 13/678760
DATED             : December 15, 2015
INVENTOR(S)       : Frederick Trisjono and Sravanthi Ningampally It is certified that error appears in the above-identified patent and that said Letters Patent is hereby corrected as shown below:

In the claims

In column 6, Claim 5, line 34, after the word --(first)-- please delete the word "an"

Signed and Sealed this
Twenty-eighth Day of June, 2016

Michelle K. Lee
*Director of the United States Patent and Trademark Office*